(12) United States Patent
Schönfeld

(10) Patent No.: US 9,845,721 B2
(45) Date of Patent: Dec. 19, 2017

(54) TWO-STROKE COMBUSTION ENGINE WITH IMPROVED FLUSHING PERFORMANCE

(71) Applicant: MAKITA CORPORATION, Anjo-shi, Aichi (JP)

(72) Inventor: Michael Schönfeld, Rohlstorf (DE)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/152,263

(22) Filed: May 11, 2016

(65) Prior Publication Data
US 2016/0333772 A1 Nov. 17, 2016

(30) Foreign Application Priority Data
May 11, 2015 (DE) .................. 20 2015 102 397

(51) Int. Cl.
| | |
|---|---|
| *F02B 33/04* | (2006.01) |
| *F02B 25/20* | (2006.01) |
| *F02B 75/02* | (2006.01) |
| *F02M 26/01* | (2016.01) |

(52) U.S. Cl.
CPC .............. *F02B 33/04* (2013.01); *F02B 25/20* (2013.01); *F02B 75/02* (2013.01); *F02M 26/01* (2016.02); *F02B 2075/025* (2013.01); *Y02T 10/146* (2013.01)

(58) Field of Classification Search
CPC ..... F02B 33/04; F02B 33/44; F02B 2075/025; F02B 75/02; F02B 25/20; F02M 26/01
See application file for complete search history.

(56) References Cited

U.S. PATENT DOCUMENTS 4,242,993 A * 1/1981 Onishi ................... F02B 33/04
123/59.7

FOREIGN PATENT DOCUMENTS

| AT | 211102 B | 9/1960 |
|---|---|---|
| DE | 2743780 A1 | 4/1979 |
| DE | 19615238 A1 | 10/1997 |
| DE | 10063042 A1 | 6/2002 |

* cited by examiner

*Primary Examiner* — Jacob Amick
(74) *Attorney, Agent, or Firm* — Oliff PLC

(57) ABSTRACT

A combustion engine having a crankcase and a cylinder, wherein a piston is guided to be movable in strokes inside cylinder, piston movably limiting a combustion chamber, and wherein in cylinder at least one transfer port is inserted, which extends between crankcase and combustion chamber, and through which an ignition mixture can flow from crankcase into combustion chamber, and which opens out into combustion chamber in an upper discharge area in such a way that ignition mixture preferably does not reach transfer ports and thus the crankcase, while at the same time a direct connection of crankcase to combustion chamber is maintained via a transfer port, which is as short as possible, it is suggested that at least one storage chamber is provided which is connected to upper discharge area and in which exhaust gas flowing from the combustion chamber into discharge area can be temporarily stored.

12 Claims, 4 Drawing Sheets

TWO-STROKE COMBUSTION ENGINE WITH IMPROVED FLUSHING PERFORMANCE

DESCRIPTION

Figure 1:
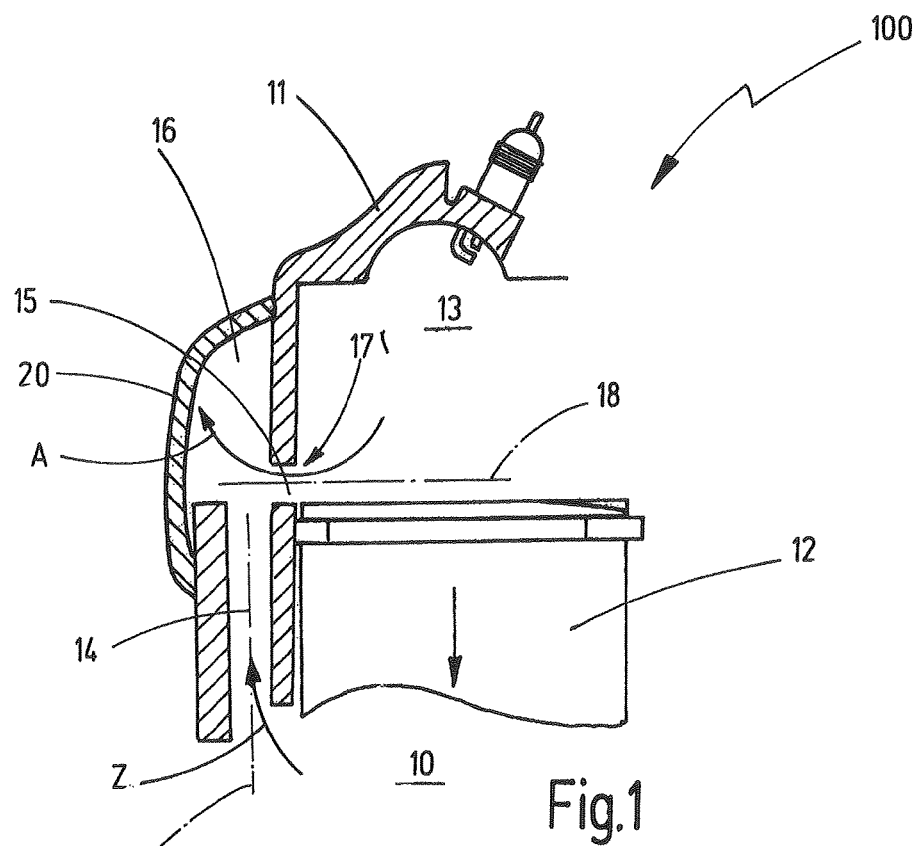

The present invention relates to a combustion engine having a crankcase and a cylinder, wherein a piston is guided to be movable in strokes inside the cylinder, the piston movably limiting a combustion chamber, and wherein in the cylinder at least one transfer port is inserted, which extends between the crankcase and the combustion chamber, and through which an ignition mixture can flow from the crankcase into the combustion chamber, and which opens out into the combustion chamber in an upper discharge area.

PRIOR ART

From U.S. Pat. No. 4,242,993 A, a combustion engine is known which works according to the two-stroke principle. The load change of the gas in the combustion chamber is carried out via ducts inserted in the cylinder. If the piston moves towards the lower dead center, the transfer ports are released, so that ignition mixture can flow from the crankcase into the combustion chamber. If the piston moves again in the direction of the upper dead center, the transfer ports close and the loaded ignition mixture can be compressed and ignited. The transfer ports have an upper discharge area, with which they enter the combustion chamber. The passage from the discharge area into the combustion chamber forms a discharge opening, which usually is embodied as a circular or horizontally extended window in the cylinder wall.

The transfer ports are connected to collecting spaces, and in the lower area of the transfer ports between the crankcase and the collecting spaces flutter valves are inserted, so that an ignition mixture, which has been transferred from the crankcase into the collecting spaces, cannot flow back into the crank case.

When the combustion engine is in operation, the ignition mixture flows from the crankcase via the flutter valves into the collecting spaces, wherein the transfer of the ignition mixture is enabled by an overpressure in the crankcase. After the collecting spaces have been filled and when the piston reaches the lower dead center the discharge openings open in the discharge area of the transfer ports between the collecting spaces and the combustion chamber, and a defined amount of ignition mixture flows from the collecting spaces into the combustion chamber. For this, each collecting space has a large volume, which is larger than the displaced volume of the combustion engine. Due to the large volume of the collecting spaces the pressure inside the collecting spaces sinks only marginally when the defined amount of ignition mixture has flowed from the collecting spaces into the combustion chamber. In particular, due to the pulsing operation a substantially constant pressure is achieved in the collecting spaces, and the transfer of the ignition mixture from the collecting spaces into the combustion chamber substantially is carried out with a constantly pulsing volume flow. By this it is avoided that the ignition mixture rushes into the combustion chamber, wherein it is in particular achieved that the ignition mixture does not reach the exhaust port unconsummated. The lower flow velocity in the discharge area of the transfer port thus leads to a lesser consumption of ignition mixture by the combustion engine.

The grading effect of the pressure of the ignition mixture for a smoother transfer into the combustion chamber via the arranged collecting spaces disadvantageously leads to a significant decrease in power of the combustion engine, as due to the decreased pressure difference only a smaller amount of ignition mixture can flow into the combustion chamber. A direct connection of the crankcase to the combustion chamber via a transfer port is inhibited by the arranged collecting spaces, so that the intake amount of ignition mixture cannot be controlled by the pressure in the crankcase for the discharge into the combustion chamber. A further disadvantage is that when the discharge areas of the transfer ports are opened when the piston reaches the lower dead center, a partial amount of the exhaust gas can reach the collecting spaces via the discharge area. This happens in particular when the residual pressure in the combustion chamber is still higher than the pressure in the collecting spaces, so that, before the ignition mixture flows into the combustion chamber, exhaust gas reaches the collecting spaces and thus a mixture of ignition mixture and exhaust gas forms within the collecting spaces, which always has to be avoided.

DISCLOSURE OF THE INVENTION

The object of the present invention is the development of a combustion engine with an improved load change, wherein particularly preferably ignition mixture should not reach the transfer ports and thus the crankcase, but at the same time a direct connection of the crankcase to the combustion chamber should be maintained by a transfer port as short as possible.

Starting out from a combustion engine this object is solved according to the preamble of claim 1 and starting out from a process it is solved according to the preamble of claim 10 with the corresponding characteristic features. Advantageous developments of the invention are stated in the dependent claims.

The invention includes the technical teaching that at least one storage chamber is provided which is connected to the upper discharge area and in which exhaust gas flowing from the combustion chamber into the discharge area can be temporarily stored.

The storage chamber is arranged in such a way that a direct connection of the crankcase to the combustion chamber is maintained via the transfer port. Thus the storage chamber does not form a part of the transfer port and, in particular in the discharge area, only connects to the transfer port, with no ignition mixture ostensibly reaching the storage chamber. The embodiment and in particular the connection of the storage chamber to the discharge area is rather provided in such a way that if the piston releases the discharge opening in the area of the lower dead center, exhaust gas does not rush into the transfer port, but only mainly into the storage chamber. However, the storage chamber only serves as a temporary reservoir for the exhaust gas, and the exhaust gas can swing from the storage chamber back into the combustion chamber. Only afterwards the ignition mixture flows from the transfer port to the combustion chamber.

By the embodiment of the combustion engine according to the invention it is avoided that when the discharge opening is released by the piston in the area of the lower dead center, exhaust gas reaches the transfer port and thus the crankcase. The storage chamber serves as a reservoir for the exhaust gas rushing into the discharge area, without the gas reaching the transfer port.

Advantageously the storage chamber has a volume which is smaller than the volume of the combustion chamber of the combustion engine. In particular, the storage chamber has a volume which is smaller than the displaced volume of the combustion engine. The smaller the storage chamber is, the faster the exhaust gas can swing back from the storage chamber into the combustion chamber. However, the storage chamber should at least have such a volume that at least a large part of the exhaust gas rushing into the discharge area can be collected in the storage chamber. It has proven particularly advantageous that the storage chamber has a volume which is 15% to 20% of the volume of the combustion chamber.

According to a further advantageous development of the combustion engine, the discharge area of the transfer port is embodied in such a way that with a discharge opening it merges into the combustion chamber, through which the exhaust gas flows along a central axis of the opening of the discharge opening into the storage chamber, when the piston releases the discharge opening when reaching the area around the lower dead center. It is particularly advantageous that the storage chamber is situated in an extension of the central axis of the opening, so that the storage chamber adjoins the discharge area. This advantage is particularly effective if a substantial section of the transfer port extends along a duct axis, in particular the area of the transfer port which merges into the curved discharge area. If the duct axis in the upper discharge area extends approximately in transverse direction to the central axis of the opening, it is avoided that exhaust gas rushing into the storage chamber reaches the transfer port along the central axis of the opening, as the transfer port bends approximately at a right angle from the central axis of the opening. The pulse of the exhaust gas acting in the direction of the central axis of the opening effectively prevents the exhaust gas from rushing into the bending transfer port. Even an effect of underpressure (Bernoulli) can be utilized if the exhaust gas flowing from the discharge opening into the storage chamber causes an underpressure in the upper area of the transfer port, which approaches the central axis of the opening at a right angle.

For example, the storage chamber is arranged at the side of the cylinder. Advantageously, two transfer ports can be inserted in the cylinder, which are arranged diametrically opposite each other, wherein a storage chamber is assigned to each of the transfer ports. As a result, two storage chambers arranged diametrically opposite each other can be provided at the cylinder.

For forming the storage chamber advantageously a housing element is provided by which the storage chamber is at least partially formed in arrangement at the cylinder. The housing element can for example be configured in half-shell shape and can be arranged at the outside of the cylinder.

According to a further embodiment the storage chamber can be configured in the housing element, wherein the housing element has an opening by which the storage chamber is connected to the discharge area of the transfer port in a fluidic manner. The advantage of a storage chamber configured in the housing element is the exchangeability of the housing element at the cylinder, as different housing elements with, for example, differently embodied storage chambers are exchangeable with each other. There is also the possibility to optionally arrange a housing element which does not have a storage chamber at the cylinder, so that in total no storage chamber is formed for the combustion engine. Additionally, combustion engines can be improved by refitting them with a storage chamber configured in the housing element.

An advantageous embodiment for the arrangement of the storage chamber is achieved if the latter is arranged on top of the discharge area. Irrespective of the arrangement of the storage chamber on top of the discharge area at first the central axis of the opening runs in transverse direction regarding the stroke axis of the cylinder in the passage from the discharge area into the storage chamber, wherein the actual volume of the storage chamber adjoins on top of the central axis of the opening.

By forming the storage chamber using a housing element the cylinder can be manufactured in a casting process in a known manner, and the housing element can for example be formed from a sheet element or the like and can be arranged to the outside of the cylinder, for example by a positive joining process. Alternatively, the housing element could be screwed to the cylinder or fastened by other fixing devices. It is also possible that the transfer port is also at least partially formed by the housing element.

A further advantageous aspect of the invention provides two storage chambers at the cylinder, which in particular are situated diametrically opposite to each other and are assigned to the respective transfer ports, wherein a chamber connection path can be provided which connects the storage chambers with each other. The chamber connection path can be inserted in the outside of the cylinder and can be closed with a closing plate. The storage chambers on both sides of the cylinder can communicate in a fluidic manner via the chamber connection path, and there can be for example a pressure compensation, or the pressure pulsation in the storage chambers can be used in a positive way.

Further, the invention focuses on a process for a load change of a combustion engine having a crankcase and a cylinder, wherein a piston is guided to be movable in strokes inside the cylinder, the piston movably limiting a combustion chamber, and wherein in the cylinder at least one transfer port is inserted, which extends between the crankcase and the combustion chamber, and through which an ignition mixture can flow from the crankcase into the combustion chamber, and which opens out into the combustion chamber in an upper discharge area. Here, the combustion engine has a storage chamber which is connected to the upper discharge area and in which exhaust gas flowing from the combustion chamber into the discharge area can be temporarily stored. The process comprises at least the following steps: opening of a discharge opening of the transfer port to the combustion chamber by a stroke movement of the piston, inflow of exhaust gas into the storage chamber, backflow of the exhaust gas from the storage chamber into the combustion chamber and inflow of ignition mixture into the combustion chamber.

A development of the process provides that a pulsating oscillation forms between the storage chamber and the combustion chamber, wherein the volume of the storage chamber advantageously is determined in such w way that the pulsating oscillation occurs close to or in a frequency range.

EXEMPLARY EMBODIMENT OF THE INVENTION

Figure 2:
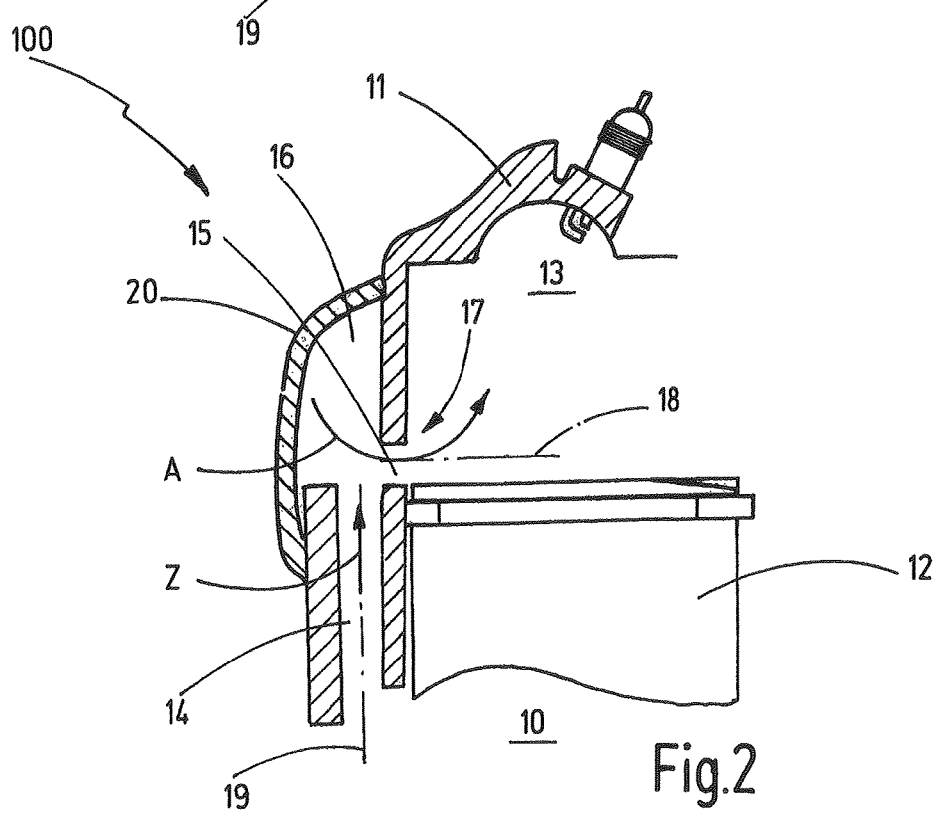
Figure 3:
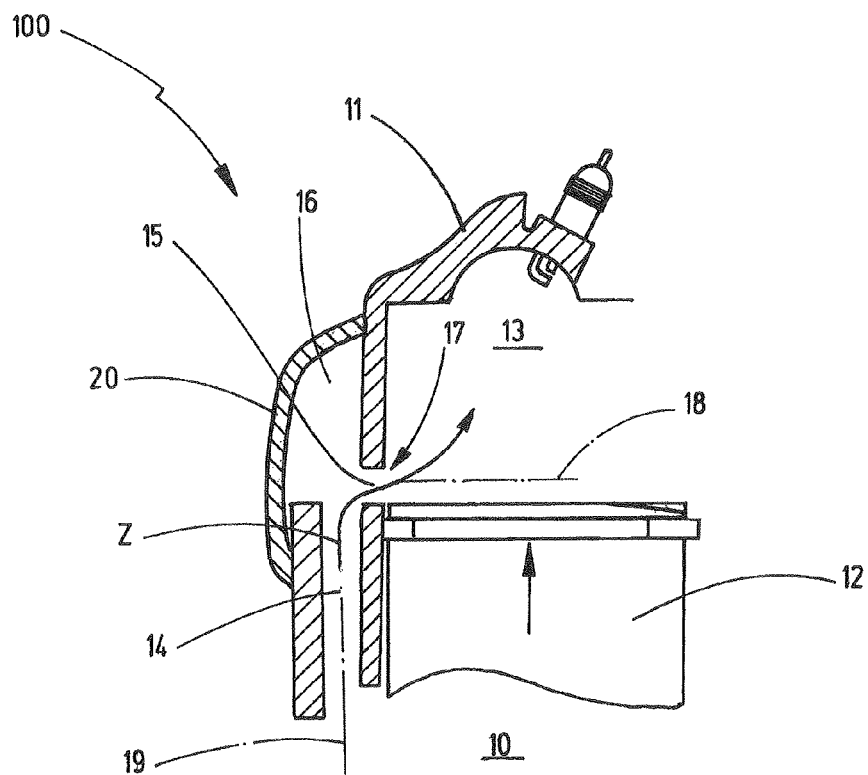
Figure 4:
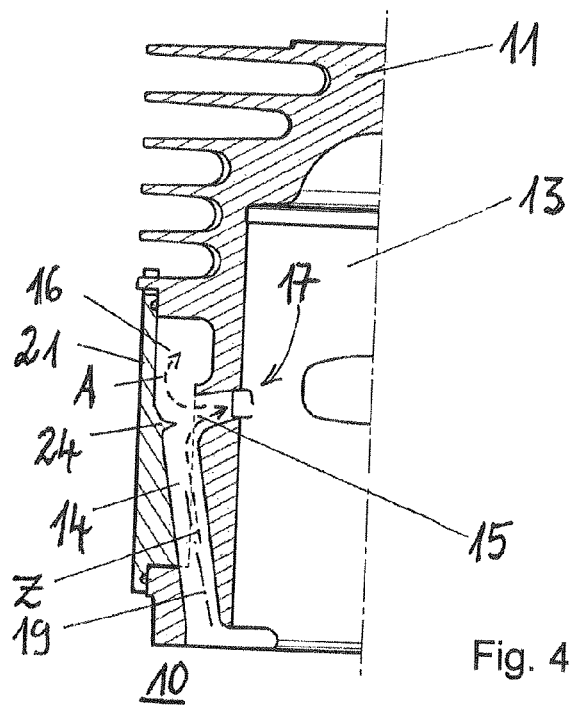
Figure 5:
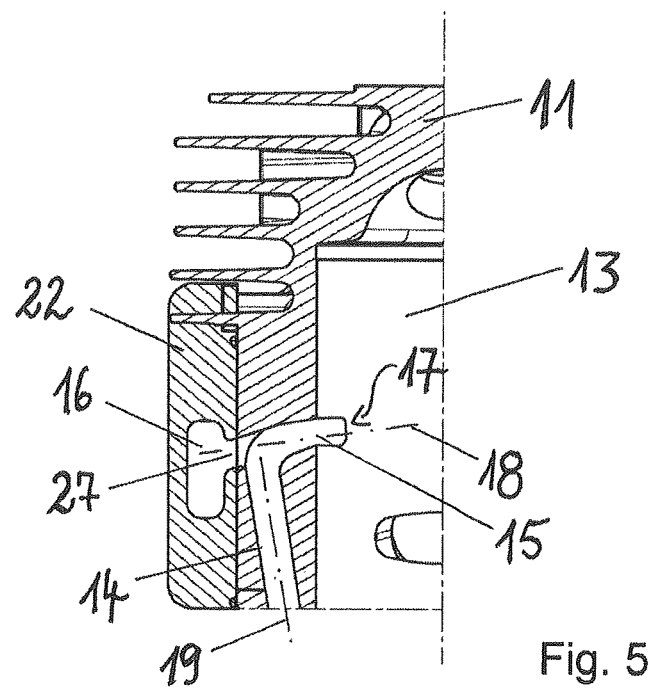
Figure 6:
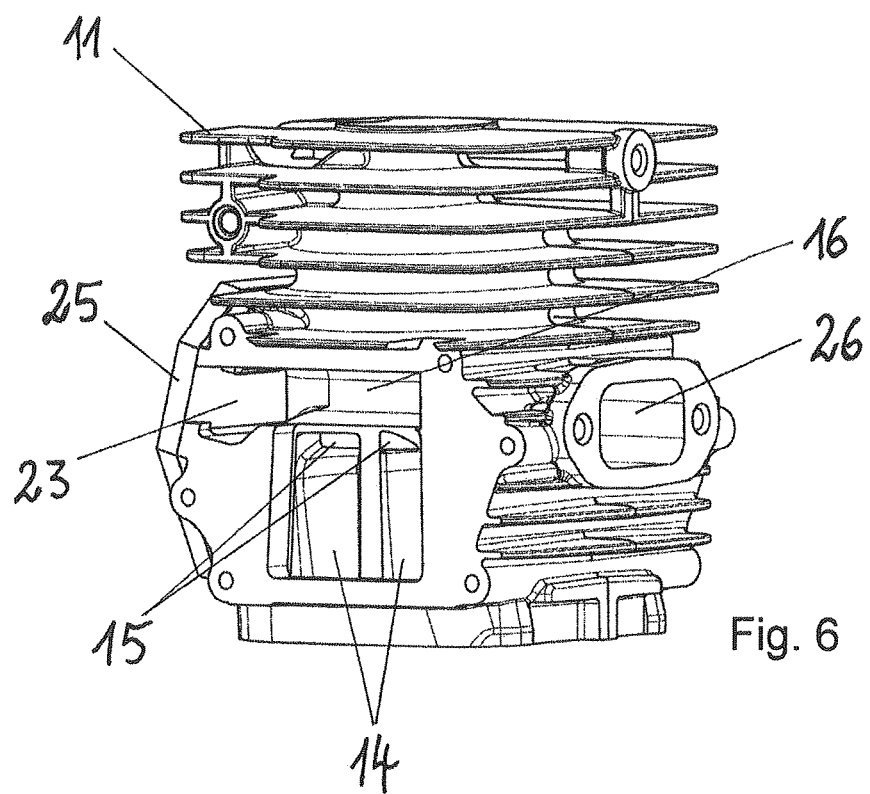
Figure 7:
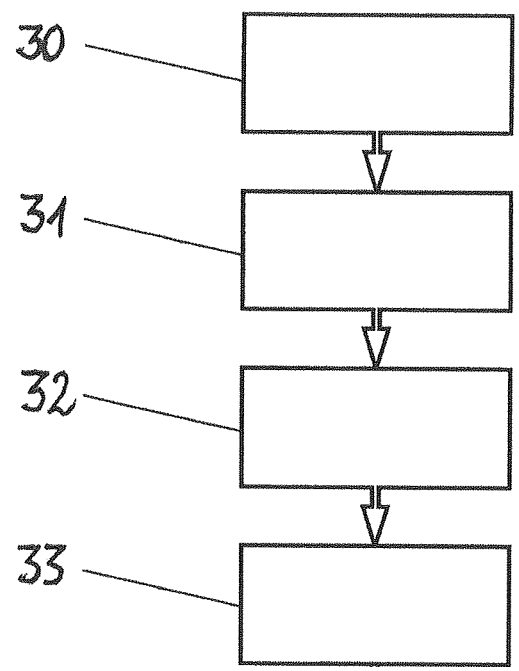

Further measures improving the invention are shown in more detail in the following together with the description of an exemplary embodiment of the invention by means of the figures. It shows:

FIG. 1 a schematic view of a part of a combustion engine with a storage chamber configured according to the invention, wherein the phase of the load change is shown in which exhaust gas flows from the combustion chamber into the storage chamber, FIG. 2 the schematic view according to FIG. 1, wherein the phase of the load change is shown in which exhaust gas flows back from the storage chamber into the combustion chamber, FIG. 3 the schematic view according to FIG. 1 or FIG. 2, wherein the phase of the load change is shown in which ignition mixture flows from the crankcase into the combustion chamber, FIG. 4 a schematic view of a part of a combustion engine in a first modified embodiment, FIG. 5 a schematic view of a part of a combustion engine in a second modified embodiment, FIG. 6 a schematic view of a cylinder of a combustion engine with a removed housing element, FIG. 7 a diagram which shows the sequence of the process in regard to the load change according to the invention, with a storage chamber in the upper discharge area of the transfer port of a combustion engine.

FIGS. 1, 2 and 3 each show a schematic view of a part of a combustion engine 100 having a crankcase 10 and a cylinder 11, wherein a piston 12 is guided to be movable in strokes inside the cylinder 11, the piston 12 movably limiting a combustion chamber 13. In the cylinder 11 a single exemplary transfer port 14 is shown, which extends between the crankcase 10 and the combustion chamber 13, wherein a further transfer port 14 can be inserted diametrically opposite in the cylinder 14, which is not shown here.

Via the transfer port 14 ignition mixture Z can flow from the crankcase 10 into the combustion chamber 13, dependent on the position of the piston 12. The transfer port 14 extends with its main section approximately parallel to the stroke axis of the piston 12 along a duct axis 19. The transfer port 14 has been inserted in the wall of the cylinder 11 for example during the casting process for the production of the cylinder 11. The upper section of the transfer port 14 is called discharge area 15 and forms the area in which the transfer port 14 merges form its main section along the duct axis 19 into the combustion chamber 13 in a bend. For this, the combustion chamber 13 has a discharge opening 17 in the cylinder 11, which is released in the lower dead center position of the piston 12.

According to the invention, a storage chamber 16 is adjoined to the upper discharge area 15. The storage chamber 16 adjoins the discharge area 15 along the central axis of the opening 18 wherein the central axis of the opening 18 is positioned approximately in a right angle on the duct axis 19 of the transfer port 14. The actual volume of the storage chamber 16 is formed above the discharge area 15, so that the flow area for filling and emptying the storage chamber 16 along the central axis of the opening 18 forms the lowest area of the storage chamber 16. The individual phases of the load change with the storage chamber are separately described below in connection with FIGS. 1, 2 and 3.

FIG. 1 shows a phase of the load change, in which the piston 12 has first released the discharge opening 17 in the wall of the cylinder 11. For this, the piston 12 is situated within or in the area of the lower dead center. Due to a residual overpressure with exhaust gas A in the combustion chamber 13, the exhaust gas A flows along the central axis of the opening 18 from the combustion chamber 13 into the storage chamber 16. Due to the impulse of the exhaust gas A in the direction of the central axis of the opening 18, which is situated in approximately a right angle to the discharge opening 17, the substantial or the total part of the exhaust gas A flows from the combustion chamber 13 into the storage chamber 16 and not into the transfer port 14.

When the overswing of the exhaust gas A from the combustion chamber 13 into the storage chamber 16 has occurred, the storage chamber 16 is under overpressure. Due to this overpressure, the exhaust gas A swings form the storage chamber 16 back into the combustion chamber 13, as shown in FIG. 2.

FIG. 2 shows the exhaust gas A with a flow movement from the storage chamber 16 back into the combustion chamber 13. Here, the pressure in the storage chamber 16 has already decreased to such an extent that the pressure of the ignition mixture Z in the transfer port 14 is approximately equal to or higher than the pressure of the exhaust gas A in the storage chamber 16. Therefore also in the phase of backflow of the exhaust gas A from the storage chamber 16 into the combustion chamber 13, no or only a very small part of the exhaust gas A flows into the transfer port 14.

FIG. 3 shows the phase of load change, after the discharge of the storage chamber 16 with the exhaust gas A has occurred, and the pressure ratio now allows an entry of the ignition mixture Z from the transfer port 14 via the discharge area 15 through the discharge opening 17 into the combustion chamber 13. The presence of the storage chamber 16 does not substantially disturb the transfer of the ignition mixture Z into the combustion chamber 13, as there can be such a larger residual pressure in the storage chamber 16, that this residual pressure of the exhaust gas A forms a gas cushion, which prevents the entering of ignition mixture Z into the storage chamber 16.

FIG. 4 shows a schematic view of a cylinder 11 of a combustion engine in a first modified embodiment. The cylinder 11 is shown in a half-section and has a transfer port 14, which extends along a sloped duct axis 19 from the crankcase 10 into a discharge area 15, which merges with the discharge opening 17 into to combustion chamber 13.

The cylinder 11 has a recess which is open towards the outside, which forms a part of a storage chamber 16 and a part of the transfer port 14. In the area of the storage chamber 16 and the transfer port 14 a housing element 21 is arranged at the outside of the cylinder 11, which is formed as an example as a massive element and closes the recess in the cylinder 11 to the outside by forming the storage chamber 16 and the transfer port 14. In a manner not shown here it is possible to screw the housing element 21 to the cylinder 11 or for example to fix the housing element 21 to the cylinder 11 by material engagement.

The exhaust gas A flowing into the storage chamber 16 and the ignition mixture Z flowing from the transfer port 14 into the combustion chamber 13 are shown simultaneously in a simplifying way, and the flowing processes following each other also in this embodiment follow the change principle shown in FIGS. 1 to 3 in the same manner. The inflow of the exhaust gas A into the storage chamber 16 is facilitated by a guiding rib 24, which is arranged at the inside of the housing element 21 and points in the direction of the discharge area 15. The guiding rib has the further effect that the ignition mixture Z flowing from the crankcase 10 into the transfer port 14 cannot or at least not in larger parts reach the storage chamber 16 directly, as the guiding rib 24 facilitates the inflow of the ignition mixture Z into the combustion chamber 13 and thus follows the bend of the discharge area 15 in an improved manner.

FIG. 5 shows a schematic view of a part of a combustion engine in a second modified embodiment. The cylinder 11 is shown in a half-section and has a transfer port 14, which extends along a duct axis 19 sloped in the direction of the piston stroke from the crankcase 10 into a discharge area 15, which merges with the discharge opening 17 into to combustion chamber 13. The transfer port 14 is formed closed in the cylinder 11 and discharges via the curved discharge area 15 with the discharge opening 17 into the combustion chamber 13.

At the outside of the cylinder 11 a housing element 22 is arranged, which is also formed as a massive element, wherein the storage chamber 16 is formed in the housing element 22 itself. In order to create a connection of the storage chamber 16 to the discharge area 15 of the transfer port 14, the storage chamber 16 in the housing element 22 has an opening 27, which adjoins the discharge area 15 of the transfer port 14. In a manner not shown in more detail the housing element 22 can be screwed to the cylinder 11 or for example be fixed to the cylinder 11 by material engagement. The advantage of a storage chamber configured in the housing element is the exchangeability of the housing element 22 at the cylinder 11, as different housing elements 22 with, for example, differently configured storage chambers are exchangeable with each other and therefore enable a modular construction of the cylinder. There is also the possibility to optionally arrange a housing element 22 at the cylinder 11 which does not have a storage chamber 16.

The opening 27 is arranged in such a way that it coincides with the central axis of the opening 18, so that the discharge opening 17 is situated in extension of the opening 27 in the housing element 22. This facilitates the inflow of exhaust gas into the storage chamber 16 while simultaneously the duct axis 19 of the transfer port 14 situated approximately at a right angle to the central axis of the opening 18 substantially prevents the entry of ignition mixture into the storage chamber 16.

FIG. 6 shows a perspective view of a cylinder 11 of a combustion engine with a removed housing element. By this, starting from the embodiment according to FIG. 4, for example, parts of the transfer port 14 become visible in a double-flow form and also parts of the discharge area 15 adjoining at the side of the combustion chamber. The storage chamber 16 is adjacent above the discharge areas 15. A further transfer port 14, which is situated in the background of the perspective view and which also has, for example, a double-flow form, is concealed in this perspective and is thus not visible. In the shown embodiment, these are connected to each other by a chamber connection path 23. The chamber connection path 23 is inserted in the outside of the cylinder 11 as a notch-like indentation and are closed by the closing plate. Via the chamber connection path 23 the storage chamber 16 on both sides of the cylinder 11 can communicate with each other in a fluidic manner and there can be for example a pressure compensation, or the pressure pulsation in the storage chambers 16 can be used in a positive way. The chamber connection path 23 is, for example, inserted in the cylinder 11 opposite to an exhaust opening 26.

FIG. 7 finally shows a diagram according to which the process for the load change of the combustion engine according to the invention can occur. In process step 30 the discharge opening 17 of the transfer port 14 opens to the combustion chamber 13 by the stroke movement of the piston 12. Step 30 is followed by step 31, which describes the inflow of the exhaust gas A into the storage chamber 16. This is followed by step 32, which comprises the backflow of the exhaust gas A from the storage chamber 16 into the combustion chamber 13 and then follows step 33, which relates to the inflow of the ignition mixture Z into the combustion chamber 13.

The process can occur in the same manner with a combustion engine 100, which has two or more transfer ports 14, and, according to the invention, a storage chamber 16 is assigned to each of the transfer ports 14.

The illustration of the combustion engine 100 according to figure a, FIG. 2 and FIG. 3 schematically shows only one transfer port 14, wherein the transfer port 14 can be configured also in a double-flow form. The embodiment of the transfer port 14 in double-flow form also enables the arrangement of a storage chamber 16, which is connected to the transfer port 14 in the upper discharge area in a fluidic manner.

LIST OF REFERENCE SIGNS 100 combustion engine
10 crank case
11 cylinder
12 piston
13 combustion chamber
14 transfer port
15 discharge area
16 storage chamber
17 discharge opening
18 central axis of the opening
19 duct axis
20 housing element
21 housing element
22 housing element
23 chamber connection path
24 guiding rib
25 closing plate
26 exhaust opening
27 opening
30 opening operation of the discharge opening
31 inflow of exhaust gas into the storage chamber
32 backflow of the exhaust gas from the storage chamber into the combustion chamber
33 inflow of the ignition mixture into the combustion chamber
A exhaust gas
Z ignition mixture

The invention claimed is:

1. A combustion engine having a crankcase and a cylinder, wherein a piston is guided to be movable in strokes inside the cylinder, the piston movably limiting a combustion chamber, and wherein in the cylinder at least one transfer port is inserted, which extends between the crankcase and the combustion chamber, and through which an ignition mixture can flow from the crankcase into the combustion chamber, and which opens out into the combustion chamber in an upper discharge area,
   wherein at least one storage chamber is provided which is connected to the upper discharge area and in which exhaust gas flowing from the combustion chamber into the upper discharge area can be temporarily stored,
   wherein the upper discharge area of the at least one transfer port is embodied in such a way that with a discharge opening it merges into the combustion chamber, through which the exhaust gas flows along a central axis of the discharge opening into the at least one storage chamber, wherein the at least one storage chamber is attached as an extension of the central axis of the discharge opening to the upper discharge area, and
   wherein a substantial section of the at least one transfer port extends along a duct axis, which runs in the upper discharge area approximately in a transverse direction to the central axis of the discharge opening.

2. A combustion engine according to claim 1, wherein the at least one storage chamber has a volume which is smaller than the volume of the combustion chamber.

3. A combustion engine according to claim 1, wherein the at least one storage chamber has a volume which is 15% to 20% of the volume of the combustion chamber.

4. A combustion engine according to claim 1, wherein the at least one storage chamber is arranged at the side of the cylinder.

5. A combustion engine according to claim 1, wherein a housing element is provided, through which the at least one storage chamber is at least partially formed in an arrangement at the cylinder.

6. A combustion engine according to claim 5, wherein the housing element is configured in half-shell shape and is arranged at the outside of the cylinder.

7. A combustion engine according to claim 5, wherein the at least one storage chamber is configured in the housing element, wherein the housing element has an opening by which the at least one storage chamber is connected to the upper discharge area of the at least one transfer port in a fluidic manner.

8. A combustion engine according to claim 1, wherein the at least one storage chamber is arranged on top of the upper discharge area.

9. A combustion engine according to claim 1, wherein two transfer ports are inserted in the cylinder, which are arranged diametrically opposite each other, wherein one of the at least one storage chamber is assigned to each of the transfer ports.

10. A combustion engine according to claim 1, wherein two storage chambers are configured at the cylinder, which are situated diametrically opposite to each other, wherein a chamber connection path is provided which connects the storage chambers with each other.

11. A process for a load change of a combustion engine according to claim 1, comprising at least the following steps:
    opening operation of the discharge opening of the at least one transfer port to the combustion chamber by a stroke movement of the piston;
    inflow of exhaust gas into the at least one storage chamber;
    backflow of the exhaust gas from the at least one storage chamber into the combustion chamber; and
    inflow of ignition mixture into the combustion chamber.

12. A process according to claim 11, wherein a pulsating oscillation forms between the at least one storage chamber and the combustion chamber, wherein the volume of the at least one storage chamber is determined in such a way that the pulsating oscillation occurs close to or in a frequency range.

* * * * *